United States Patent
Signorelli et al.

(10) Patent No.: US 9,146,332 B2
(45) Date of Patent: Sep. 29, 2015

(54) REMOTELY LOCATED TUNING CIRCUITS FOR MULTI-FREQUENCY, MULTI-PURPOSE INDUCTION ANTENNAE IN DOWNHOLE TOOLS

(75) Inventors: John Signorelli, Cypress, TX (US); Samuel Bell, Tomball, TX (US); Tsili Wang, Katy, TX (US); Roland Edward Chemali, Kingwood, TX (US); Sheng Fang, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 259 days.

(21) Appl. No.: 13/252,019

(22) Filed: Oct. 3, 2011

(65) Prior Publication Data

US 2012/0032868 A1    Feb. 9, 2012

Related U.S. Application Data

(62) Division of application No. 12/215,434, filed on Jun. 27, 2008, now abandoned.

(51) Int. Cl.
    *G01V 3/28*      (2006.01)
(52) U.S. Cl.
    CPC ........................................ *G01V 3/28* (2013.01)
(58) Field of Classification Search
    CPC . G01R 33/3808; G01R 33/341; G01R 33/383
    USPC .......................................................... 324/346
    See application file for complete search history.

(56) References Cited

U.S. PATENT DOCUMENTS

| | | | |
|---|---|---|---|
| 4,511,843 A | | 4/1985 | Thoraval |
| 4,965,522 A | | 10/1990 | Hazen et al. |
| 5,243,289 A | * | 9/1993 | Blum et al. .................. 324/322 |
| 5,530,358 A | | 6/1996 | Wisler et al. |
| 6,163,151 A | * | 12/2000 | Wisler et al. .................. 324/303 |
| 6,777,940 B2 | | 8/2004 | Macune |
| 7,038,455 B2 | * | 5/2006 | Beste et al. .................. 324/333 |
| 7,301,429 B1 | * | 11/2007 | Hall et al. .................... 336/192 |
| 7,482,812 B2 | | 1/2009 | Moore |
| 2005/0030021 A1 | * | 2/2005 | Prammer et al. ............. 324/303 |
| 2005/0030035 A1 | * | 2/2005 | Beste et al. .................. 324/338 |
| 2006/0181281 A1 | | 8/2006 | Moore |
| 2006/0238199 A1 | * | 10/2006 | Larsen ......................... 324/329 |
| 2010/0283468 A1 | * | 11/2010 | Signorelli et al. ............ 324/333 |
| 2012/0051189 A1 | | 3/2012 | Signorelli et al. |

\* cited by examiner

*Primary Examiner* — Tung X Nguyen
*Assistant Examiner* — Alesa Allgood
(74) *Attorney, Agent, or Firm* — Mossman Kumar & Tyler PC

(57) ABSTRACT

An antenna system for a downhole tool has an antenna that is configured to operate at a plurality of frequencies. The tuning circuit is on the interior of the tool and shielded from borehole fluids. The tuning circuit is coupled to the antenna by a transformer circuit.

11 Claims, 8 Drawing Sheets

REMOTELY LOCATED TUNING CIRCUITS FOR MULTI-FREQUENCY, MULTI-PURPOSE INDUCTION ANTENNAE IN DOWNHOLE TOOLS

CROSS-REFERENCE TO RELATED APPLICATIONS

This application is a divisional of U.S. patent application Ser. No. 12/215,434 filed on Jun. 27, 2008, the disclosure of which is incorporated herein by reference in its entirety.

FIELD OF THE INVENTION

The present invention relates generally to measurement tools used in hydrocarbon exploration and production, and more particularly to a tool for measurement of certain characteristics of a downhole formation.

BACKGROUND OF THE INVENTION

Measuring multiple frequency responses of a subterranean formation with a logging tool such as a high definition induction logging tool (HDIL) or a three-dimensional (3D) explorer (3DEX), is very common for formation evaluations. However, only a single frequency or perhaps two frequencies are customarily used for logging while drilling (LWD) tools. For example, the OnTrak® LWD system commercially offered by the Assignee of the present invention employs two frequencies to measure formation resistivity while drilling. The two frequencies (400 kHz and 2 Mhz) offer different depths of investigation so that a resistivity profile can be better resolved.

On the other hand, for certain measurements, such as azimuthal propagation resistivity, measurement at a lower frequency, for example around 100 kHz, can be beneficial.

As is known in the art, for some tools, a broadband antenna without tuning may be used, or the antenna may be tuned separately to two frequencies using known techniques that do not involve the use of switches or relays. It has also been shown that an antenna can be tuned to more than two frequencies through the use of switches or relays. An example of the latter is described in U.S. Pat. No. 7,038,455 to Beste et al., entitled "Electromagnetic Wave Resistivity Tool." The Beste et al. '455 patent is hereby incorporated by reference herein in its entirety.

In typical prior art arrangements, such as that described in the Beste et al. '455 patent, for each antenna on the tool, there is an associated junction box formed in the wall of the tool. The junction box serves to contain the tuning circuitry for the antenna, including any switches or relays required for multiple-frequency tuning. The junction box for a receiving antenna typically also contains a pick-up coil used to detect current in the antenna. Such an arrangement is described in further detail in U.S. Pat. No. 5,530,358 to Wisler et al., entitled "Method and Apparatus for Measurement While Drilling Utilizing Improved Antennas." The Wisler et al. '358 patent is commonly assigned to the Assignee of the present invention and is hereby incorporated by reference herein in its entirety.

Since junction boxes are machined into the sidewall of the tubular tool body, it is necessary to enclose or seal them, such as with an epoxy or the like, in order to protect the circuitry within the junction box from the harsh conditions to which tools are exposed during utilization. Even with such protective materials, there is a risk that elements such as switches or relays contained within a junction box may not be durable enough to withstand the harsh conditions of a drilling operation. Incorporating such delicate components can thus result in a shorter operational life for the tool.

As noted in the Wisler et al. '358 patent, a further concern is that the tubular tool is weakened wherever junction boxes are formed in the sidewall. Machining of junction boxes into a tubular element's sidewall jeopardizes the structural integrity and load-bearing ability of the tool, to an extent that may not be acceptable in particularly difficult drilling operations.

SUMMARY OF THE INVENTION

In view of the foregoing, the present invention relates to an arrangement for multiple-frequency resistivity measurement whereby an antenna can be tuned to be resonant at multiple frequencies with a unified tuning circuit which does not require switches or relays, or, alternatively, an arrangement whereby more sensitive components are remotely located in more protected internal spaces within the tool, thereby obviating the need for junction boxes to be formed in the sidewall of the tubular.

In one embodiment, a unified tuning circuit is provided which consists of a transformer and a capacitor in series connection with one or more tank circuits comprising a parallel connection of a capacitor and an inductor. By adding more parallel tank circuits into the tuning circuit, the antenna can be tuned to be resonant at more frequencies.

In one embodiment, the unified tuning circuit for an antenna is incorporated into the transceiver electronics for that antenna; these electronics are disposed in an internal space within the tool, thereby minimizing their exposure to the harsher conditions nearer to the exterior of the tool.

In accordance with another aspect of the invention, an antenna can be provided that is capable of selectively operating both as a transmitter and a receiver, thereby providing many more possible antenna configurations for the purposes of resistivity measurements and the like.

In accordance with another aspect of the invention, the antenna can be frequency swept over a large range of frequencies while maintaining a resonant state at all individual frequencies.

BRIEF DESCRIPTION OF THE DRAWINGS

The foregoing and other features and aspects of the present invention will be best appreciated by reference to a detailed description of the specific embodiments of the invention, when read in conjunction with the accompanying drawings, wherein.

DETAILED DESCRIPTION OF A SPECIFIC EMBODIMENT OF THE INVENTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering and programming practices for the environment in question. It will be appreciated that such development efforts might be complex and time consuming, outside the knowledge base of typical laymen, but would nevertheless be a routine undertaking for those of ordinary skill in the relevant fields.

Figure 1:
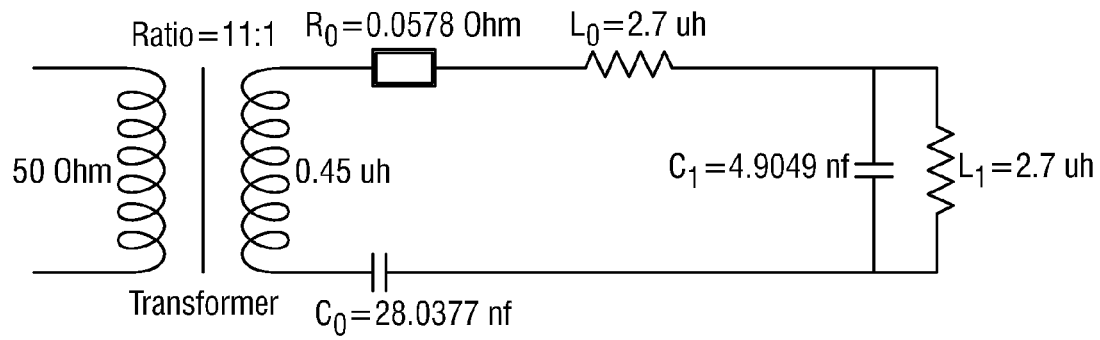
FIG. 1 is a schematic diagram of a typical tuning circuit for a two-frequency tuned antenna.

FIG. 1 is a schematic diagram of a tuning circuit for a two-frequency-tuned antenna such as may be utilized as part of a downhole tool for making measurements of electrical properties of downhole formations. As will be appreciated by those of ordinary skill, an antenna for reforming resistivity measurements and the like typically are exposed on the outer surface of a hollow, substantially cylindrical tool body. Typically, an antenna takes the form of one or more loops around the circumference of the tool body, and may be recessed into the body to minimize exposure to damaging forces.

In FIG. 1, $L_0$ and $R_0$ are the inductance and resistance, respectively, of an antenna loop wire. $L_1$, $C_0$ and $C_1$ are the tuning components for an exemplary embodiment. The circuit is tuned to have a pure resistive output of 50 D.

Figure 2:
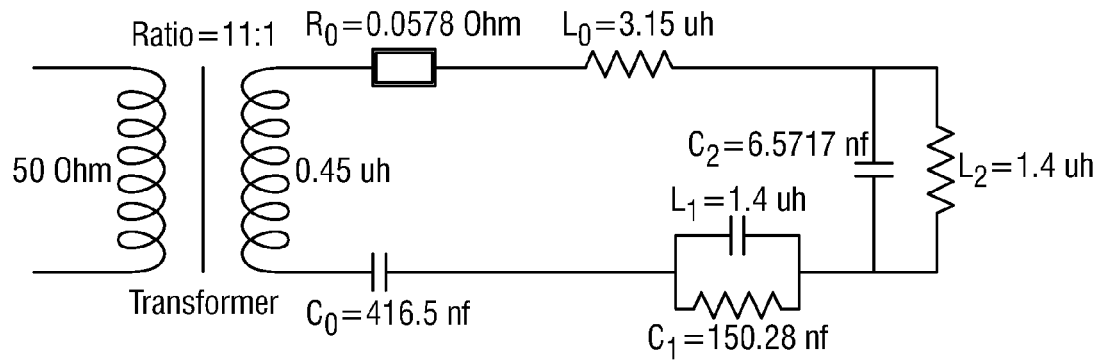
FIG. 2 is a schematic diagram of a tuning circuit for a three-frequency-tuned antenna in accordance with one embodiment of the invention.
Figure 3:
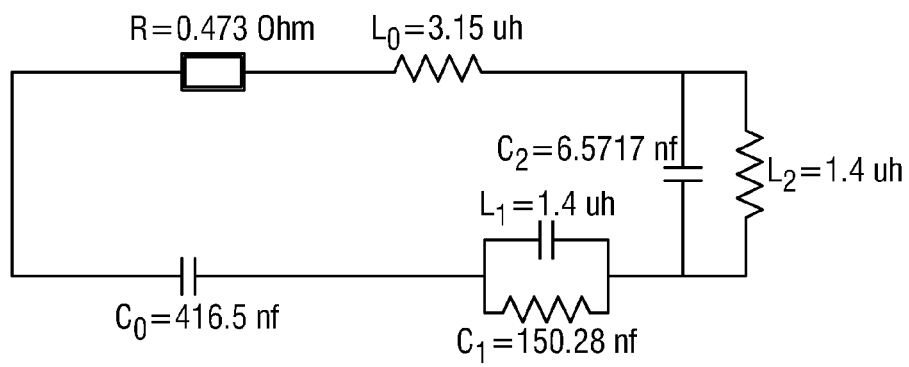
FIG. 3 is a schematic diagram of the equivalent circuit for FIG. 2 assuming an ideal transformer.

FIG. 2 is the schematic of a tuning circuit for a three-frequency-tuned antenna. Again, $L_0$ and $R_0$ are the inductance and resistance, respectively, of an antenna loop wire. The $L_1$-$C_1$ combination is for the first frequency, the $L_2$-$C_2$ combination is for the second frequency, and the $L_0$-$C_0$ combination is for the third frequency. FIG. 3 is a schematic of the equivalent circuit of FIG. 2 for an ideal transformer. The output impedance of the circuit in FIG. 3 is given by $$Z = R + j\omega L_0 + \frac{1}{j\omega C_0} + \frac{j\omega L_1}{1 - \omega^2 L_1 C_1} + \frac{j\omega L_2}{1 - \omega^2 L_2 C_2}$$

Figure 4:
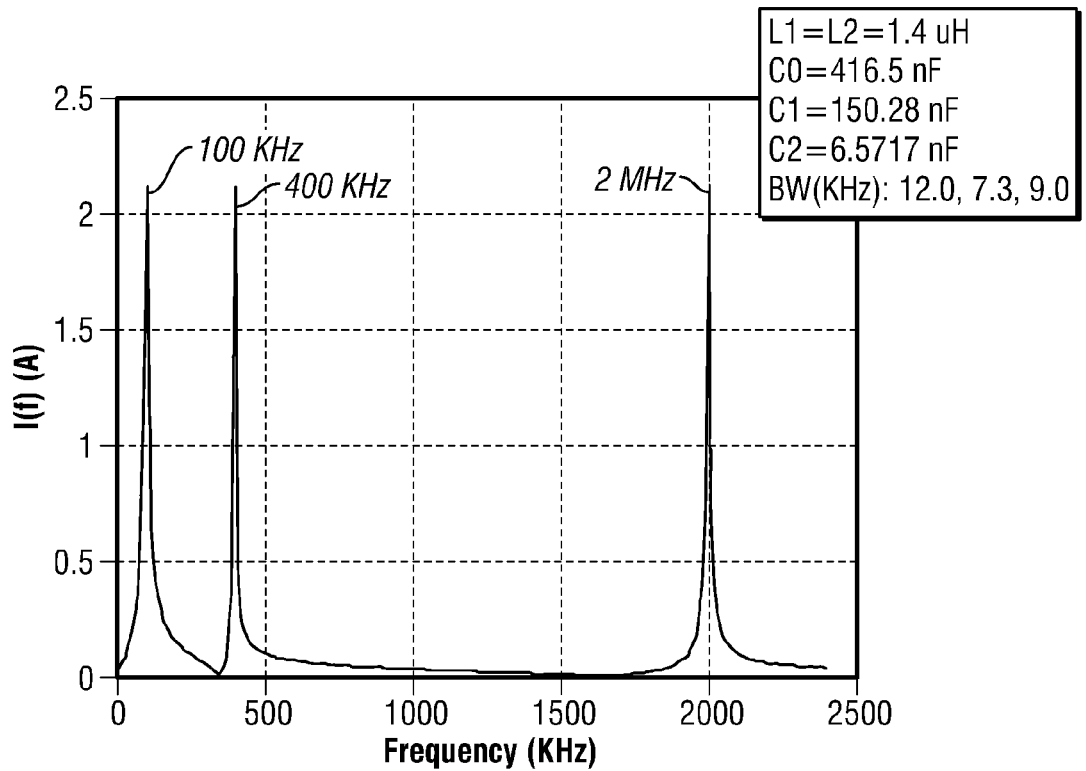
FIG. 4 is a plot of the current spectrum for the tuning circuit of FIG. 2.

As would be apparent to those of ordinary skill, the tuning parameters are found by searching all possible L and C values such that the output impedance is a pure resistance for every desired frequency. The tuning parameters and the current spectrum for the three frequencies at 100 kHz, 400 kHz and 2 MHz are shown in FIG. 4. In this regard, those of ordinary skill will understand that the tuning of an antenna to be resonant at a particular frequency means that the current spectrum for some range of frequencies centered at a particular frequency undergoes a significant peak. This range for a tuned frequency is referred to as the bandwidth of the tuning. Thus, for example, when it is stated that an antenna is "tuned to a particular frequency X," those of ordinary skill will understood this to mean that for some range of frequencies between X−$\Delta_1$ and X+$\Delta_2$, the current spectrum undergoes a substantial peak relative to unturned frequencies, such that the bandwidth of the tuning is $\Delta_1$+$\Delta_2$. In an hypothetical ideal system, $\Delta_1$ and +$\Delta_2$ would be or at least approach zero, but of course real-world implementations can only approximate the ideal case.

Figure 5:
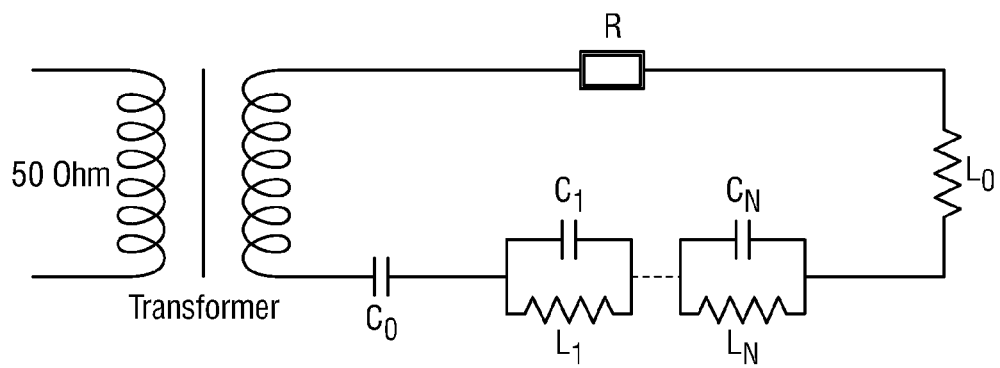
FIG. 5 is a schematic diagram of general tuning circuit for (N+1)-frequency-tuned antennae in accordance with one embodiment of the invention.

FIG. 5 is a schematic of a general tuning circuit for N+1-frequency-tuned antennae. $L_o$ is the inductance of the antenna loop, $C_0, C_1, \ldots C_N$ are tuning capacitors and $L_1, L_2, \ldots L_N$ are tuning inductors.

Figure 6:
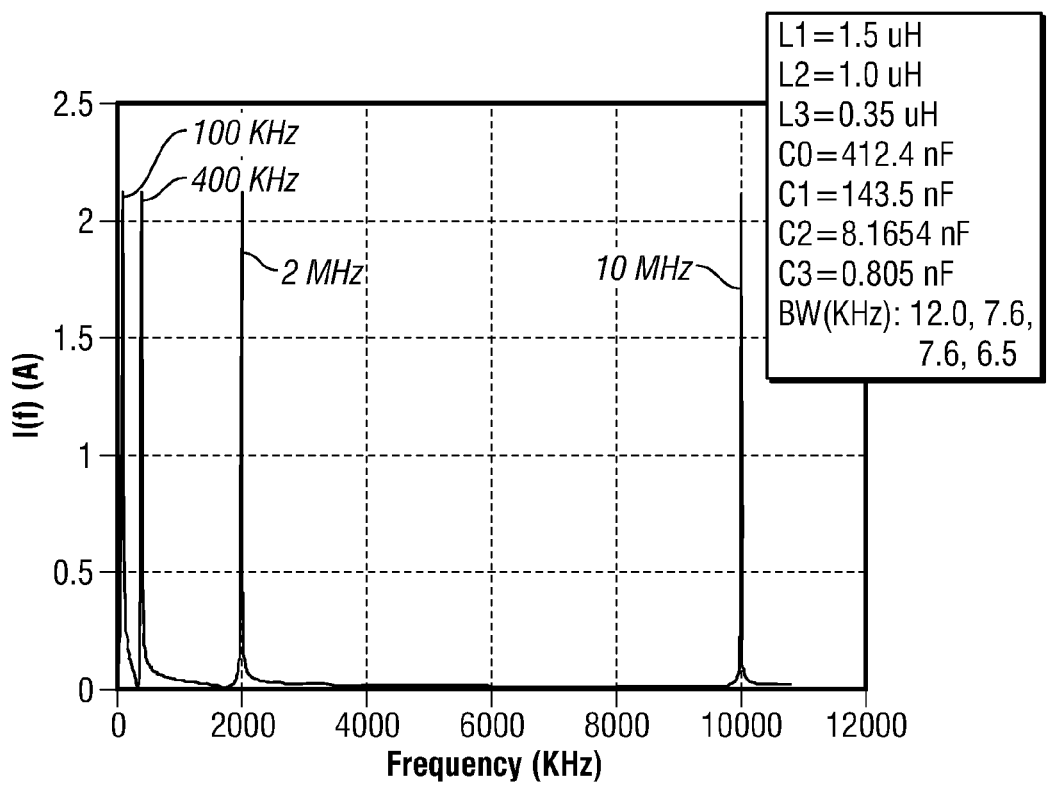
FIG. 6 is a plot of the current spectrum and its tuning parameters for a four frequency-tuned antenna.

FIG. 6 is the current spectrum for a four-frequency tuned antenna with the following tuning parameters:

$L_1$=1.5 µH
L2=1.0 µH
$L_3$=0.35 µH
$C_0$=412.4 nF
$C_1$=143.5 nF
$C_2$=8.1654 nF
$C_3$=0.805 nF

The tuning parameters and the current spectrum are shown on FIG. 3. FIG. 4 shows a general circuit for tuning an antenna to be resonant at multiple frequencies. The tuned frequencies and their bandwidths are, respectively, 100 kHz/12.0 kHz, 400 kHz/7.6 kHz, 2 MHZ/7.6 kHz, and 10 MHz/6.5 kHz.

Figure 7:
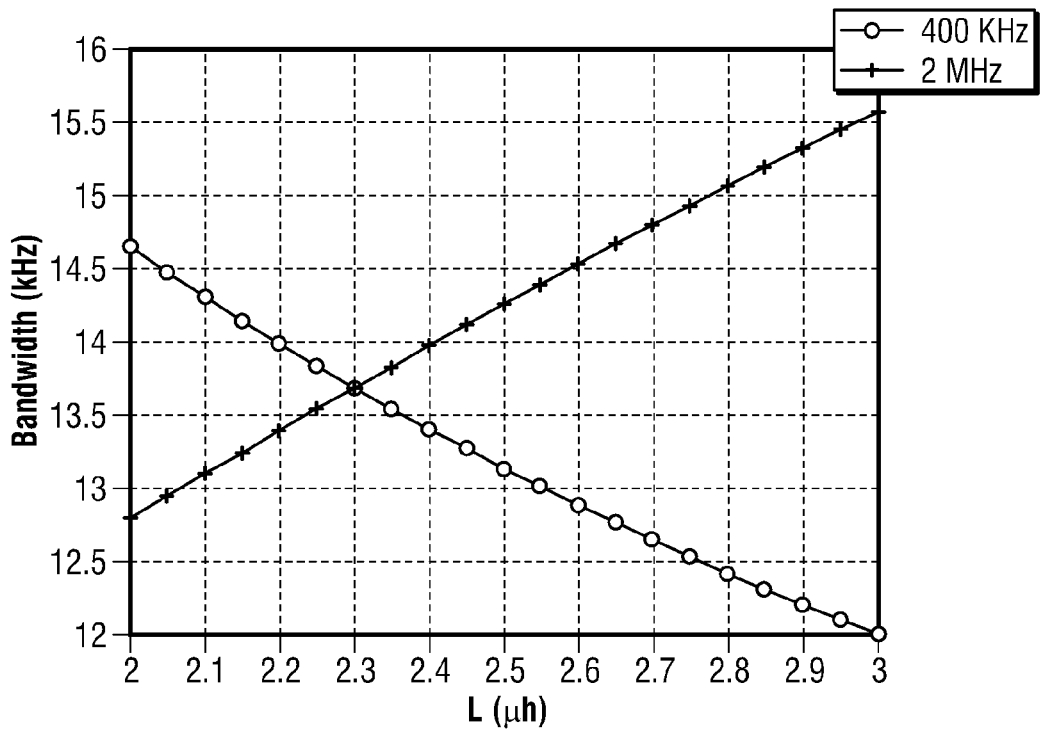
FIG. 7 is a plot of bandwidth versus tuning inductance of two frequencies.

With respect to the bandwidth, those of ordinary skill will appreciate that for a two-frequency resonant circuit, for example, it suffices to tune capacitors $C_1$ and $C_2$ while leaving $L_1$ fixed. However, the bandwidth will change with $L_1$. FIG. 7 shows the variations of bandwidth for 400 kHz and 2 MHz with changes in $L_1$ for the two-frequency-tuned circuit of FIG. 1.

From the foregoing it will be apparent to those of ordinary skill in the art that multiple-tuned circuits can achieved without the necessity of switches or relays, by including a plurality of tank circuits each comprising parallel connected inductors and capacitors.

Figure 8:
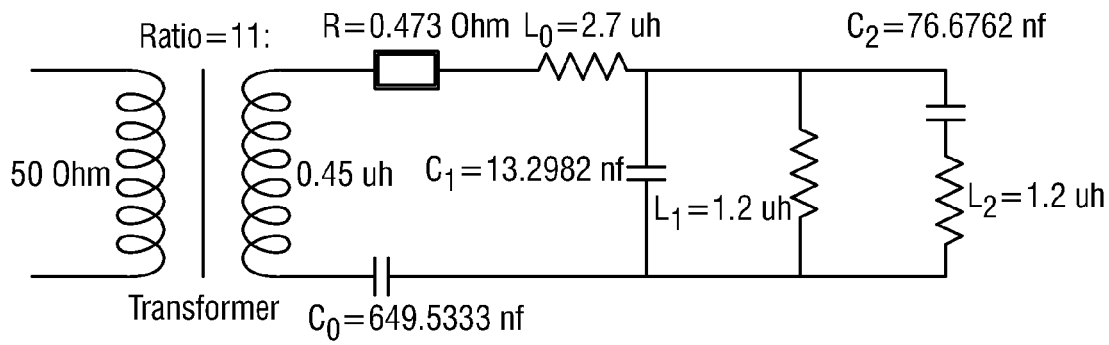
FIG. 8 is a schematic diagram of a tuning circuit for a three-frequency-tuned antenna in accordance with another embodiment of the invention.

As an alternative, rather than adding L-C parallel tank circuits to obtain additional resonance frequencies, an L-C series combination can be added to the circuit (in addition to the initial $L_1$–$C_1$ tank circuit, as shown in FIG. 8. As before, in FIG. 8, $L_o$ and $R_o$ represent the inductance and resistance of the antenna loop.

Figure 9:
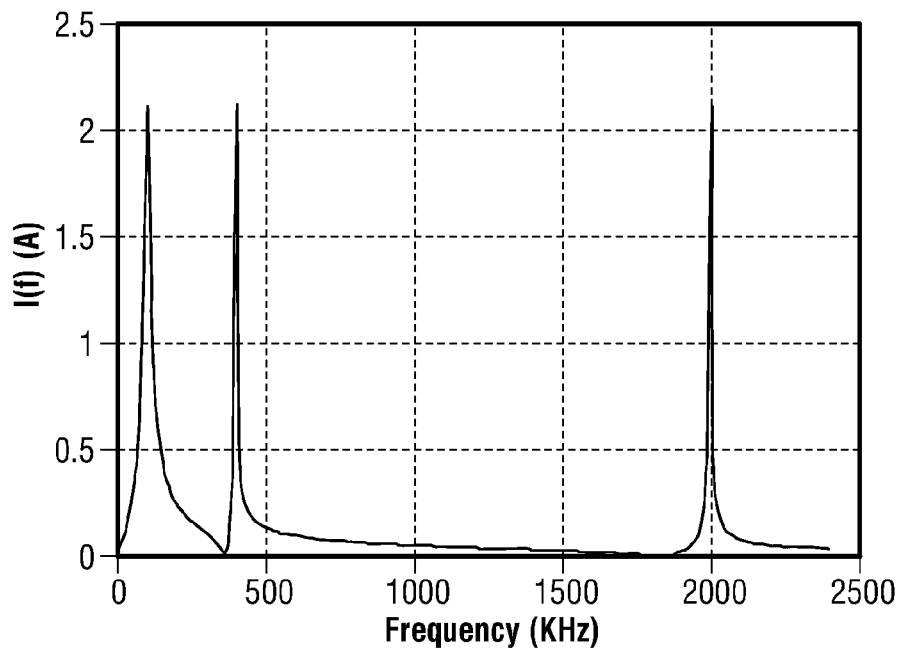
FIG. 9 is the plot of the current spectrum for the tuning circuit of FIG. 8.

FIG. 9 shows the current spectrum for the circuit of FIG. 8, assuming the following circuit parameters:

$L_1$=1.2 µH
$L_2$=1.2 µH
$C_0$=649.5333 nF
$C_1$=13/2982 nF
$C_2$=76.67662 nF

The resultant resonance frequencies and their respective bandwidths are 100 kHZ/18.6 kHz, 400 kHz/7.4 kHz, and 2 MHz/7.6 kHz.

Figure 10:
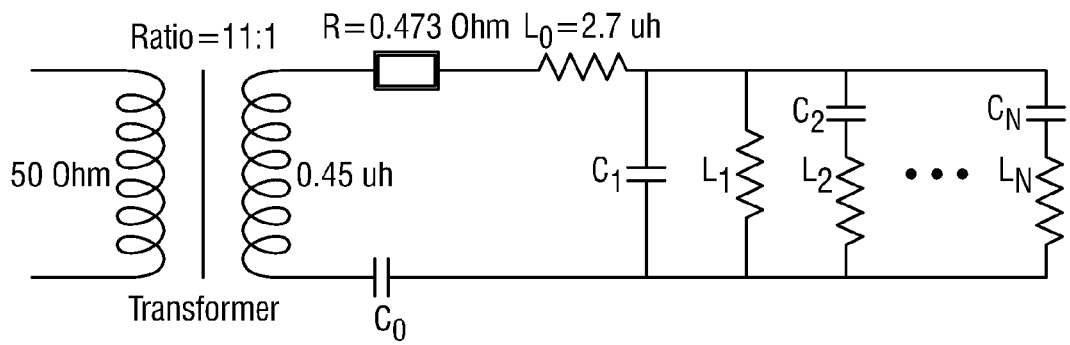
FIG. 10 is a schematic diagram of a general tuning circuit for N+1-frequency-tuned antennae in accordance with one embodiment of the invention.

FIG. 10 is a general tuning circuit for N+1 frequencies using the series LC combination in accordance with the alternative embodiment.

In accordance with one advantageous aspect of the invention, the tuning circuits as described above do not rely upon relays or switches to achieve the desired tuning, thus eliminating the possibility of failure as a result of the harsh downhole environment during a drilling operation. This is particularly where such components are not protected by the hollow substantially cylindrical body of a tool, but instead are embedded into the exterior of the metal body, as in the case of electrodes as well as components contained within a junction box as is commonly practiced in the art.

Alternatively, and in accordance with a further aspect of the invention, it has been shown that tuning circuits as described above can be incorporated into the receiver and/or transmitter circuitry of a measurement tool. Typically, such circuitry is disposed at a location internal to the hollow cylindrical body of the tool, and as such is not subjected to the much harsher conditions existing at the periphery of the tool where the antennae themselves are situated.

Figure 11:
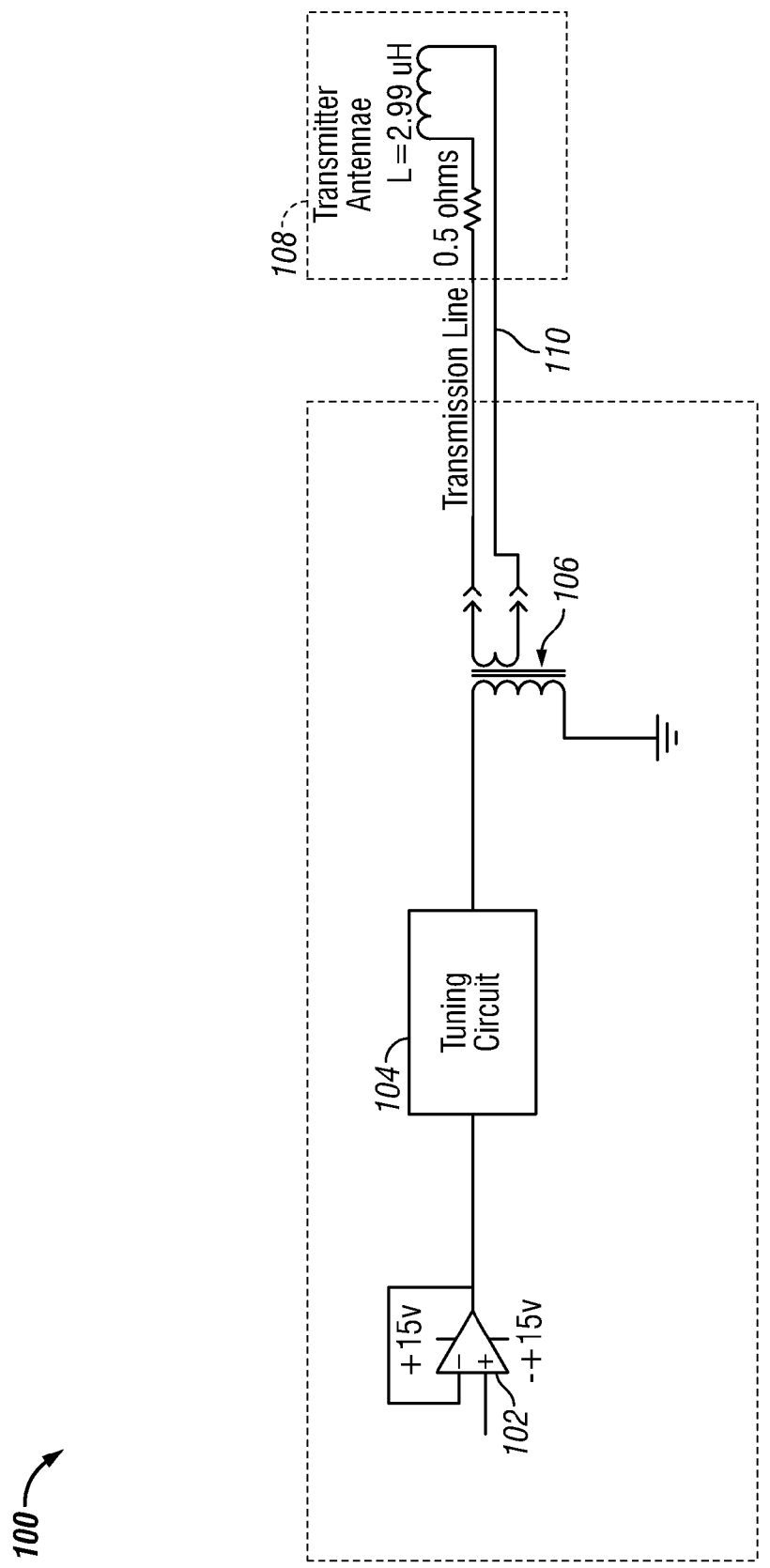
FIG. 11 is a schematic diagram of a transmitter antenna and associated driving and tuning circuitry in accordance with one embodiment of the invention.

Turning now to FIG. 11, there is shown a tuned antenna system 100 in accordance with an alternative embodiment of the invention. As shown in FIG. 11, an antenna driver 102 generates a source signal and passes this signal to a tuning circuit 104. The tuned signal is transformer coupled by transformer 106 and a transmission antenna 108 via a transmission line 110.

It is notable in FIG. 11 that the transmitter driver, tuning circuit and transformer are integrated, and physically situated fully inside the body of the tool. This integration is represented the dashed line 112 in FIG. 11. That is, no junction box is required for the antennae in system 100. In the presently preferred embodiment of the invention, transmission line 110 may be a coaxial cable, or, alternatively, a shielded twin axial line. Line 110 may be between 0.1 and 10 feet in length.

Figure 12:
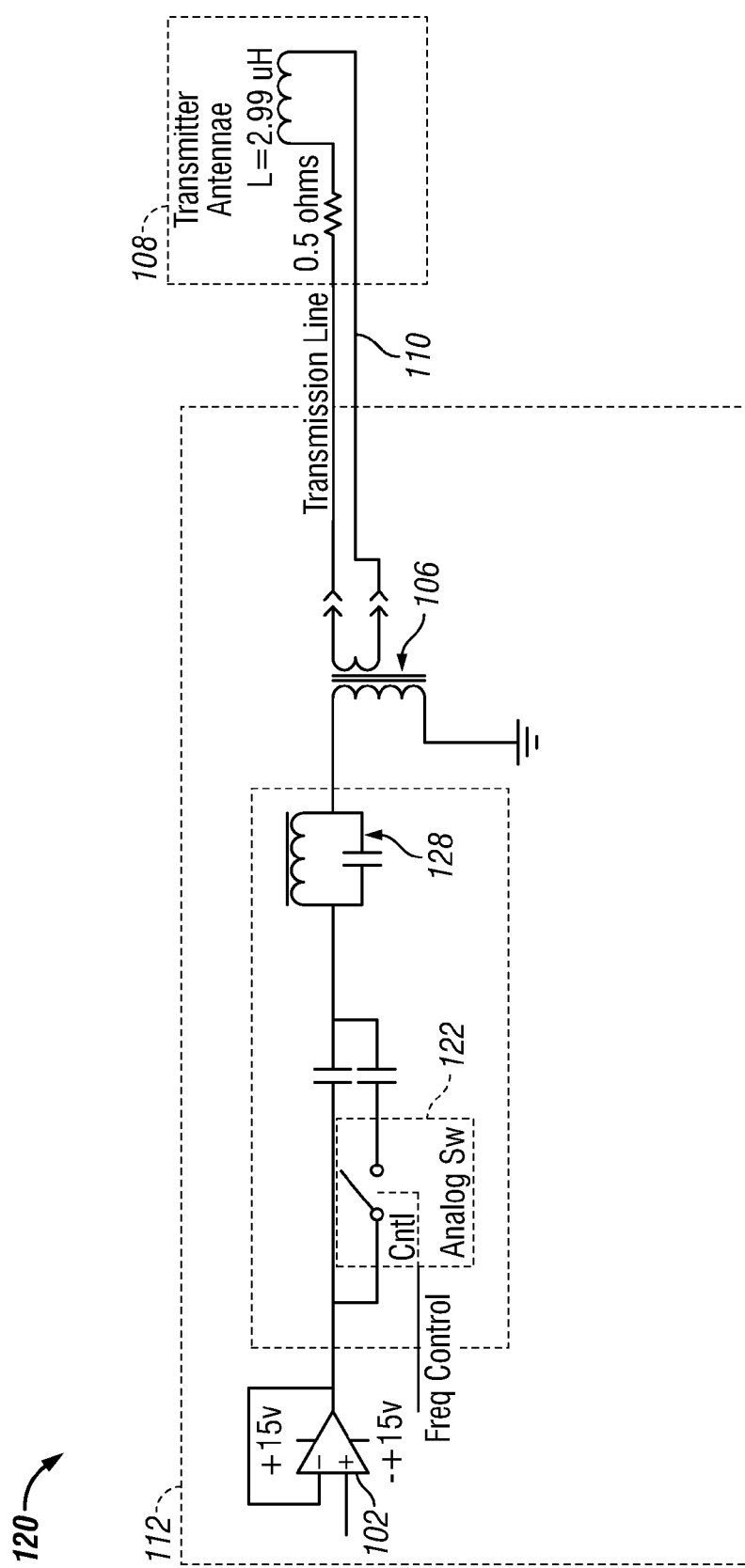
FIG. 12 is a schematic diagram of a transmitter system for a downhole tool in accordance with an alternative embodiment of the invention.

Turning to FIG. 12, there is shown an antenna system 120 in another embodiment of the invention. The embodiment of FIG. 12 takes advantage of the placement of the antenna tuning circuitry on a relatively less harsh internal space within a tool, rather than in a junction box. In particular, because of this placement of the tuning circuitry, the system 120 of FIG. 12 includes a switch 122. Other components of system 120 are substantially identical to those in FIG. 11 and therefore retain common reference numerals in the Figures.

In the system 120 of FIG. 12, the switch 122 is a component of the tuning system that serves to selectively introduce a capacitance 124 into the driving channel. With switch 122 in an open state, the tuning circuitry 104 comprises a capacitance 126 as well as a tank circuit 128 comprising a parallel-connected capacitor and inductor. The component values in the illustrative example of FIG. 12, are such that the transmitter is tuned to 400 kHz and 2 MHz. When switch 122 is closed, capacitor 124 is introduced, resulting in circuit 104 being tuned to 100 kHz and 2 MHz. Therefore, by switching between two states, circuit 104 is effectively tuned to a total of three frequencies.

In the presently preferred embodiment, switch 122 is an analog switch, i.e., an integrated circuit CMOS switch having no mechanical parts. Alternatively, switch 122 may comprise a solid state device, a relay, or other known switching mechanism, as would be apparent to those of ordinary skill in the art. Switch 122 is controlled via a control line 130 that couples circuit 104 to a controlling system, such as a microprocessor- or microcontroller-based system, or one controlled by other means, such as a relay, an application specific integrated circuit (ASIC), a digital signal processor (DSP) or any other system used to control the operation of a downhole tool such as described herein.

Figure 13:
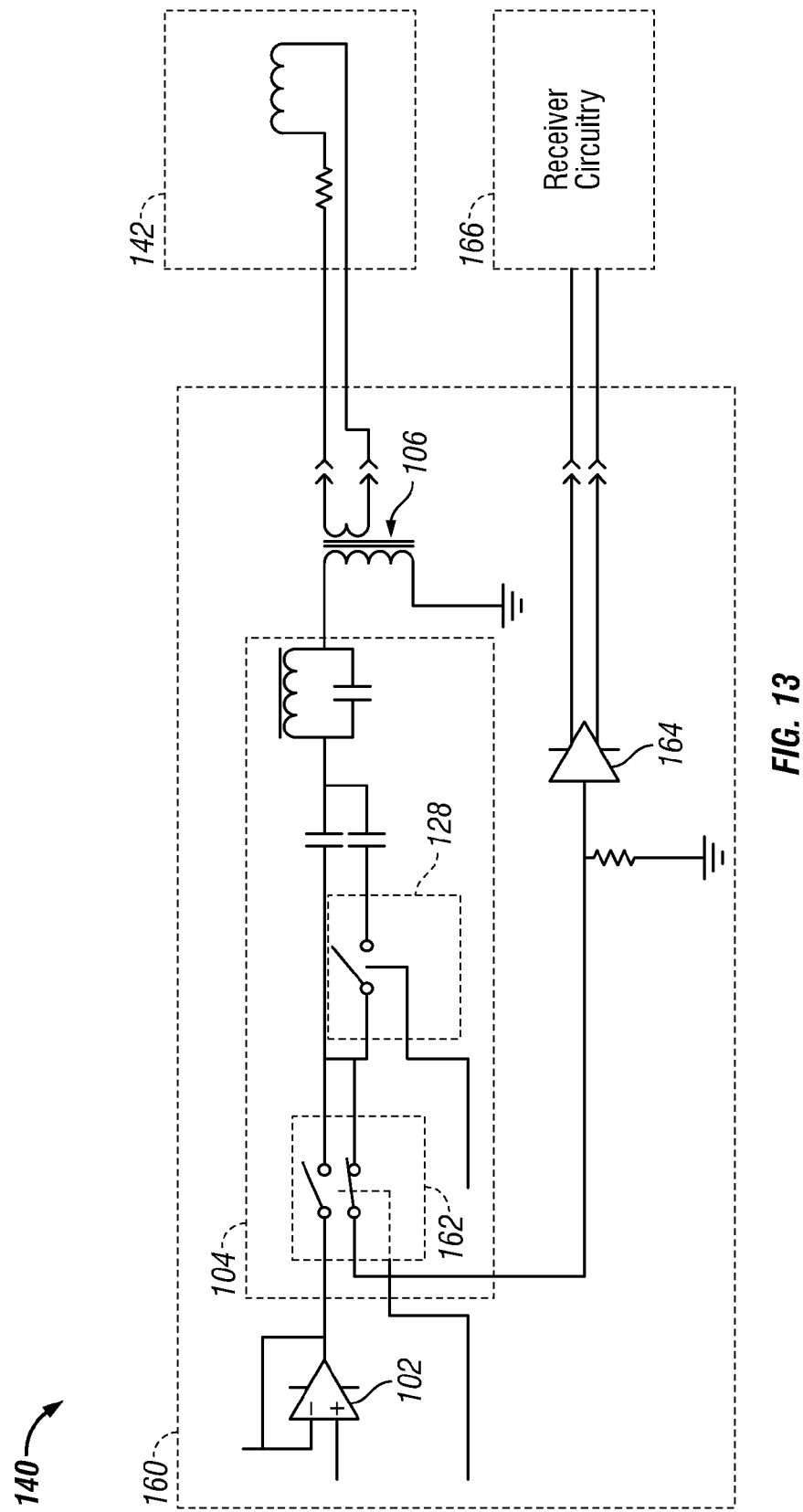
FIG. 13 is a schematic diagram of a transceiver system for a downhole tool in accordance with another alternative embodiment of the invention.

Turning to FIG. 13, there is shown an antenna sending and receiving system 140 in accordance with yet another embodiment of the invention. (Again, components in FIG. 13 that are substantially identical to those in FIGS. 11 and 12 retain identical reference numerals in FIG. 13). System 140 includes an antenna 142 that functions selectively as both a transmitting antenna and a receiving antenna for operation of the tool. Once again, the embodiment of FIG. 13 takes advantage of the placement of the antenna tuning circuitry at an internal location within the tool, enabling a transceiver circuit 160 to include one or more switches.

In the embodiment of FIG. 13, a double-pole switch 162 switches the system 140 between a transmitting mode and a receiving mode. For one state of switch 130, a transmitter driving circuit is communicated through a tuning circuit 104 to transformer 106, coupled to antenna 142, which thereby serves to transmit the tuned driving signal.

With switch 162 in another state, antenna 142 serves as a receiver circuit, such as commonly found in downhole exploration tools. Signals received by antenna 142 are transformer-coupled by transformer 106 to tuning circuit 104. Tuning circuit 104 is itself switchable between two tuning modes, as in the embodiment of FIG. 12.

The received signal is conducted through switch 162 to a receiver preamplifier 164 and then to the receiver circuit board 166 for the tool, as is customary. By providing fixed antennae each capable of operating either as a receiver or a transmitter, the operator is given many more options for taking resistivity measurements, thereby improving the operator's ability to have a selective antenna configuration and hence a selective depth of investigation over a wider range than possible with single-purpose antennae of the prior art.

Figure 14:
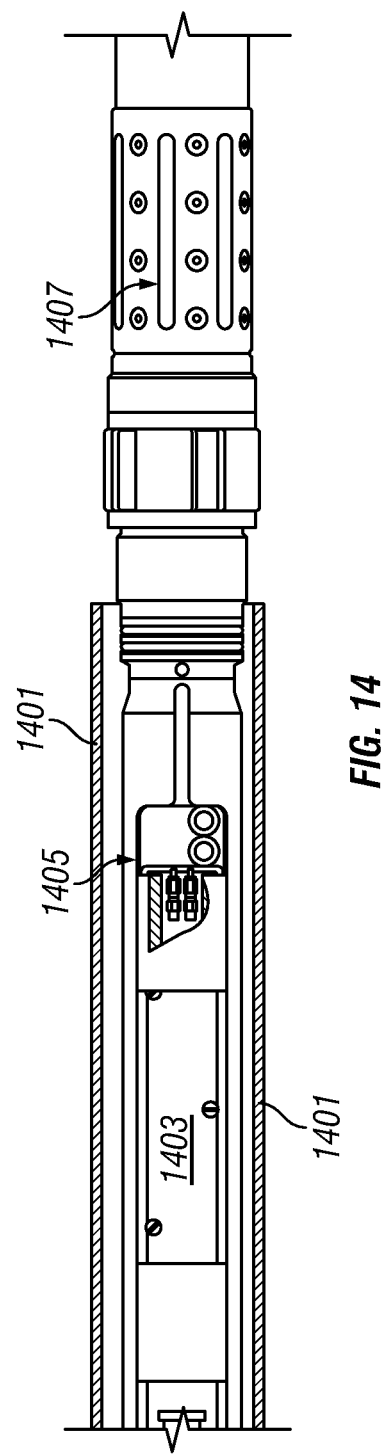
FIG. 14 shows the tuning circuit, transformer and receiver within the cylindrical body with the antenna exposed.

Turning now to FIG. 14, a protective sleeve 1401 is shown enclosing a cylindrical tool body. Inside the cylindrical tool body are the receiver 1403 and the tuning circuit and transformer 1405. It can be seen that the tuning circuit and transformer 1405 are entirely within the cylindrical tool body. The antenna 1407 is exposed.

From the foregoing disclosure, it should be apparent that a multiple frequency tuned antenna for resistivity measurement has been disclosed. Antennae in accordance with the invention have been shown to be advantageous for tuning an antenna to be resonant at more than two frequencies and in one embodiment consists of a or more tank circuits comprising a parallel-connected capacitor and inductor combination or a serial-connected capacitor and inductor combination. In one embodiment, the invention involves systems including antennae arranged to serve either as a receiver antenna or a transmitting antenna.

Those of ordinary skill in the art will recognize that the present invention may be advantageously practiced in conjunction with anyone of a multitude of known logging devices, including, for example, the device disclosed in the aforementioned Wisler et al. '281 patent. Although a specific embodiment of the invention as well as possible variants and alternatives thereof have been described and/or suggested herein, it is to be understood that the present disclosure is intended to teach, suggest, and illustrate various features and aspects of the invention, but is not intended to be limiting with respect to the scope of the invention, as defined exclusively in and by the claims, which follow.

Indeed, it is contemplated and to be explicitly understood that various substitutions, alterations, and/or modifications, including but not limited to any such implementation variants and options as may have been specifically noted or suggested herein, including inclusion of technological enhancements to any particular method step or system component discovered or developed subsequent to the date of this disclosure, may be made to the disclosed embodiment of the invention without necessarily departing from the technical and legal scope of the invention as defined in the following claims.

What is claimed is:

1. An antenna system for a downhole measurement tool, comprising:
   an antenna comprising at least one antenna loop;
   a unified tuning circuit remotely separated from said antenna by a transformer and within said downhole measurement tool; and
   a switching circuit having a first state and a second state;
   wherein when said switching circuit is in said first state, said antenna functions as a transmitter antenna and when said switching circuit is in said second state, said antenna functions as a receiving antenna;
   wherein said tuning circuit comprises a plurality of tank circuits configured to selectively tune said antenna to be simultaneously resonant at at least two frequencies.

2. The antenna system in accordance with claim 1, wherein said tuning circuit is coupled to a primary winding of said transformer and said antenna is coupled by a transmission line to a secondary winding of said transformer.

3. The antenna system in accordance with claim 1, wherein the plurality of tank circuits comprises at least one tank circuit having a capacitor and inductor in parallel.

4. The antenna system in accordance with claim 3, wherein the plurality of tank circuits further comprises an inductor and capacitor in series with the at least one tank circuit.

5. The antenna system in accordance with claim 1, further comprising:
   control circuitry for controlling said switching circuit.

6. The antenna system in accordance with claim 5, wherein said tuning circuit is configured to selectively tune said antenna to be simultaneously resonant at a multiple of swept single frequencies over a given dynamic range.

7. The antenna system in accordance with claim 6, wherein said tuning circuit does not include switches or relays.

8. The antenna system in accordance with claim 5, wherein said tuning circuit is configured to selectively tune said antenna to be simultaneously resonant at at least three frequencies.

9. The antenna system in accordance with claim 8, wherein said tuning circuit does not include switches or relays.

10. The antenna system in accordance with claim 9, wherein the plurality of tank circuits comprises at least one tank circuit having a capacitor and inductor in parallel.

11. The antenna system in accordance with claim 10, wherein the plurality of tank circuits further comprises an inductor and capacitor in series with the at least one tank circuit.

* * * * *